US009150716B2

(12) United States Patent
Saitou et al.

(10) Patent No.: US 9,150,716 B2
(45) Date of Patent: Oct. 6, 2015

(54) RESIN FOAM AND FOAM SEALING MATERIAL

(75) Inventors: Makoto Saitou, Ibaraki (JP); Itsuhiro Hatanaka, Ibaraki (JP); Kazumichi Kato, Ibaraki (JP); Kiyoaki Kodama, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 13/991,745

(22) PCT Filed: Nov. 29, 2011

(86) PCT No.: PCT/JP2011/077534
§ 371 (c)(1),
(2), (4) Date: Jun. 5, 2013

(87) PCT Pub. No.: WO2012/081396
PCT Pub. Date: Jun. 21, 2012

(65) Prior Publication Data
US 2013/0251979 A1    Sep. 26, 2013

(30) Foreign Application Priority Data

Dec. 14, 2010   (JP) .................................. 2010-278620
Nov. 24, 2011   (JP) .................................. 2011-255901

(51) Int. Cl.
*C08L 23/12*    (2006.01)
*C08J 9/12*     (2006.01)
(Continued)

(52) U.S. Cl.
CPC ................. *C08L 23/12* (2013.01); *C08J 9/122* (2013.01); *C08L 23/20* (2013.01); *C09J 7/0289* (2013.01); *C08J 2203/08* (2013.01); *C09J 2201/606* (2013.01); *C09J 2201/622* (2013.01); *C09J 2433/00* (2013.01); *Y10T 428/249983* (2015.04)

(58) Field of Classification Search
USPC ................................................ 428/315.7, 343
See application file for complete search history.

(56) References Cited

U.S. PATENT DOCUMENTS 8,101,671 B2 *    1/2012    Kanae et al. ................... 521/130
2005/0053779 A1   3/2005    Saitou et al.
(Continued)

FOREIGN PATENT DOCUMENTS

CN    1618918 A       5/2005
CN    101522769 A     9/2009
(Continued)

OTHER PUBLICATIONS

International Search Report for PCT/JP2011/077534 dated Jan. 10, 2012.
(Continued)

*Primary Examiner* — Hai Vo
(74) *Attorney, Agent, or Firm* — Sughrue Mion, PLLC (57) ABSTRACT

There is provided a resin foam excellent in dustproof performance, particularly dustproof performance in a dynamic environment. The resin foam of the present invention has a thickness recovery ratio of 65% or more, wherein the thickness recovery ratio is defined as a ratio of a thickness 1 second after releasing a compressed state to an initial thickness, when the resin foam is compressed for 1 minute in the thickness direction so as to give a thickness equal to 20% of the initial thickness in a 23° C. atmosphere; and then the compressed state is released in a 23° C. atmosphere.

9 Claims, 2 Drawing Sheets

(51) Int. Cl.
*C08L 23/20* (2006.01)
*C09J 7/02* (2006.01)

(56) References Cited

U.S. PATENT DOCUMENTS

| | | |
|---|---|---|
| 2005/0248102 A1 | 11/2005 | Sato |
| 2009/0209670 A1 | 8/2009 | Kanae et al. |
| 2010/0016458 A1 | 1/2010 | Saitou et al. |
| 2010/0233457 A1 | 9/2010 | Kato et al. |
| 2011/0171455 A1 | 7/2011 | Fujii et al. |

FOREIGN PATENT DOCUMENTS

| | | |
|---|---|---|
| JP | 2005-097566 A | 4/2005 |
| JP | 2005-227392 A | 8/2005 |
| JP | 2007-291337 A | 11/2007 |
| JP | 2008-088283 A | 4/2008 |
| WO | WO 2007119625 A1 * | 10/2007 |
| WO | WO 2009038005 A1 * | 3/2009 |

OTHER PUBLICATIONS

Office Action dated May 6, 2014, issued by the State Intellectual Property Office of P.R. China in corresponding Chinese Application No. 201180059631.5.
Notification of Reasons for Refusal dated Apr. 14, 2015 from the Japanese Patent Office in counterpart application No. 2011-255901.
Office Action dated Apr. 20, 2015 from the Taiwanese Patent Office in counterpart application No. 100146317.
Notification of Second Office Action dated Oct. 16, 2014, issued by the State Intellectual Property Office of the People's Republic of China in counterpart Application No. 201180059631.5.

* cited by examiner

RESIN FOAM AND FOAM SEALING MATERIAL

CROSS REFERENCE TO RELATED APPLICATIONS

This application is a National Stage of International Application No. PCT/JP2011/077534 filed Nov. 29, 2011, claiming priority based on Japanese Patent Application Nos. 2010-278620 filed Dec. 14, 2010 and 2011-255901 filed Nov. 24, 2011, the contents of all of which are incorporated herein by reference in their entirety.

TECHNICAL FIELD

The present invention relates to a resin foam excellent in dynamic dustproofness. The present invention specifically relates to a resin foam used for a foam sealing material. The present invention more specifically relates to a resin foam used for a foam sealing material which is used around a display such as an LCD (liquid crystal display) for the purpose of dustproofing, shading, cushioning, and the like, and to a resin foam used for a foam sealing material which is used inserted between a display such as an LCD (liquid crystal display) and a housing (window part) for the purpose of dustproofing, shading, cushioning, and the like.

BACKGROUND ART

As a sealing material, resin foams have been used for fixing optical members such as image display members which are fixed to image display devices such as liquid crystal displays, electroluminescence displays, and plasma displays and cameras and lenses which are fixed to so-called "cellular phones" and "personal digital assistants") to a predetermined site (such as a fixing part).

For example, an integrally molded article of a low-density micro-cell urethane foam and a plastic film (refer to Patent Literature 1), a polyolefin resin foam having a density of not more than 0.2 g/cm$^3$ (refer to Patent Literature 2), or the like has been used as a resin foam for the sealing material as described above.

These resin foams are frequently processed into a desired shape when they are fixed to a predetermined site.

CITATION LIST

Patent Literature

Patent Literature 1: Japanese Unexamined Patent Application Publication (JP-A) No. 2005-227392
Patent Literature 2: Japanese Unexamined Patent Application Publication (JP-A) No. 2007-291337

SUMMARY OF INVENTION

Technical Problem

In recent years, a higher dustproof performance than before is required in sealing materials with the enlargement and enhanced functionality (loading of a touch panel function as an information input function) of the image display parts mounted in cellular phones and personal digital assistants. Particularly required in cellular phones and personal digital assistants is the dustproof performance in a so-called dynamic environment such as in a vibration environment or under an impact load environment. Further, in addition to such dustproof performance, the clearance (gap, space) where the resin foam is used has been reduced in size with the reduction in the thickness of cellular phones and personal digital assistants, and therefore, flexibility that can follow fine clearance is also required.

Therefore, an object of the present invention is to provide a resin foam which is excellent in dustproof performance, particularly dustproof performance in a dynamic environment. Further, another object of the present invention is to provide a resin foam which is excellent in dustproof performance, particularly dustproof performance in a dynamic environment, and has flexibility that can follow fine clearance.

Solution to Problem

As a result of intensive investigations to solve the above problems, the present inventors have found that a resin foam excellent in strain recovery properties can be obtained when the resin foam has a thickness recovery ratio of a predetermined value or more. The present invention has been completed based on these findings.

Specifically, the present invention provides a resin foam having a thickness recovery ratio of 65% or more, wherein the thickness recovery ratio is defined as a ratio of a thickness 1 second after releasing a compressed state to an initial thickness, when the resin foam is compressed for 1 minute in the thickness direction so as to give a thickness equal to 20% of the initial thickness in a 23° C. atmosphere; and then the compressed state is released in a 23° C. atmosphere.

The present invention further provides the resin foam as described above, wherein the resin foam has an average cell diameter of 10 to 180 μm, a repulsive stress at 50% compression of 0.1 to 3.0 N/cm$^2$, and an apparent density of 0.01 to 0.10 g/cm$^3$, wherein the repulsive stress at 50% compression is defined as a repulsive load when the resin foam is compressed in the thickness direction so as to give a thickness equal to 50% of the initial thickness in a 23° C. atmosphere.

The present invention further provides the resin foam as described above, wherein a resin constituting the resin foam includes a thermoplastic resin.

The present invention further provides the resin foam as described above, wherein the resin foam is formed through the steps of impregnating a resin composition with high-pressure gas and then subjecting the impregnated resin composition to decompression.

The present invention further provides the resin foam as described above, wherein the gas is an inert gas.

The present invention further provides the resin foam as described above, wherein the inert gas is carbon dioxide.

The present invention further provides the resin foam as described above, wherein the gas is a gas in a supercritical state.

The present invention further provides a foam sealing material comprising the resin foam.

The present invention further provides the foam sealing material as described above, wherein an adhesive layer is formed on the resin foam.

The present invention further provides the foam sealing material as described above, wherein the adhesive layer is formed on the resin foam through a film layer.

The present invention further provides the foam sealing material as described above, wherein the adhesive layer is an acrylic pressure-sensitive adhesive layer.

Advantageous Effects of Invention

The resin foam of the present invention is excellent in dustproof performance, particularly dustproof performance in a dynamic environment.

DESCRIPTION OF EMBODIMENTS

The resin foam of the present invention is a foam comprising a resin, and is obtained by foaming and molding a resin composition which is a composition containing a resin. The shape of the resin foam of the present invention is preferably a sheet form (including a film form), but is not particularly limited thereto.

In the resin foam of the present invention, the thickness recovery ratio to be defined below is 65% or more (for example, 65 to 100%), preferably 70% or more (for example, 70 to 100%), and more preferably 75% or more (for example, 75 to 100%).

The thickness recovery ratio is defined as a ratio of thickness 1 second after releasing a compressed state to an initial thickness, when the resin foam is compressed for 1 minute in the thickness direction so as to give a thickness equal to 20% of the initial thickness in a 23° C. atmosphere; and then the compressed state is released in a 23° C. atmosphere. Note that in the present application, when simply referred to as "thickness recovery ratio", it means the thickness recovery ratio according to the above definition.

Since the resin foam of the present invention has a thickness recovery ratio of 65% or more, it is excellent in strain recovery properties. Therefore, the foam sealing material comprising the resin foam exhibits good dustproofness, particularly good dynamic dustproofness (dustproof performance in a dynamic environment). Therefore, in the case where the foam sealing material comprising the resin foam of the present invention is attached to clearance, the entry of foreign matter such as dust can be prevented by the quick recovery of thickness to fill the clearance even when the foam sealing material is deformed by the impact from vibration or dropping, that is, even in the state where the foam sealing material is compressed to a thickness of the clearance to which it is attached or less.

In the resin foam of the present invention, the repulsive stress at 50% compression to be defined below is preferably 0.1 to 3.0 N/cm$^2$, more preferably 0.1 to 2.0 N/cm$^2$, further preferably 0.1 to 1.7 N/cm$^2$, but is not particularly limited thereto. The repulsive stress at 50% compression is defined as a repulsive load when the resin foam is compressed in the thickness direction so as to give a thickness equal to 50% of the initial thickness in a 23° C. atmosphere. Note that in the present application, when simply referred to as "repulsive stress at 50% compression", it means The repulsive stress at 50% compression according to the above definition.

When the resin foam of the invention of the instant application has a repulsive stress at 50% compression of 0.1 to 3.0 N/cm$^2$, it will exhibit good flexibility, and when it is used as a foam sealing material, the followability to fine clearance can be exhibited. Therefore, in the case where the foam sealing material comprising the resin foam of the present invention is attached to clearance, a failure due to the repulsion of the foam sealing material can be prevented even if the clearance is narrow. Note that when a foam sealing material comprising a resin foam having a repulsive stress at 50% compression exceeding 3.0 N/cm$^2$ is applied to clearance, it may cause a trouble such as: (a) the foam sealing material cannot follow the clearance; (b) a member, a housing, and the like surrounding the foam sealing material are deformed at the sealing; and (c) the foam sealing material causes color unevenness in an image display part.

The resin foam of the present invention preferably has a closed cell structure or semi-open/semi-closed cell structure (a cell structure containing both a closed cell moiety and a semi-open/semi-closed cell moiety, and the ratio between these moieties is not particularly limited) as a cell structure in terms of obtaining dustproofness and better flexibility, but is not particularly limited thereto. In particular, it is suitable that a resin foam have a cell structure containing 40% or less (preferably 30% or less) of the closed cell moiety.

In the resin foam of the present invention, the average cell diameter of the cell structure is preferably 10 to 180 μm, more preferably 10 to 150 μm, further preferably 10 to 90 μm, most preferably 20 to 80 μm, but is not particularly limited thereto.

The average cell diameter can be determined, for example, by capturing an enlarged image of a cell portion using a digital microscope (trade name "VH-8000" supplied by Keyence Corporation) and analyzing the image using image analysis software (trade name "Win ROOF" supplied by Mitani Corporation).

In the resin foam of the invention of the instant application, when the upper limit of the average cell diameter of the foam is set to 180 μm or less (preferably 150 μm or less, further preferably 90 μm or less, most preferably 80 μm or less), dustproofness can be increased, and light blocking effect can be improved. On the other hand, when the lower limit of the average cell diameter of the foam is set to 10 μm or more (preferably 20 μm or more), cushioning properties (impact absorbing properties) can be improved.

The apparent density of the resin foam of the present invention is preferably 0.01 to 0.10 g/cm$^3$, more preferably 0.02 to 0.08 g/cm$^3$, but is not particularly limited thereto. If the apparent density is less than 0.01 g/cm$^3$, a problem in strength may occur, thereby preventing good processability (particularly punchability) from being obtained. On the other hand, if the density exceeds 0.10 g/cm$^3$, flexibility may be reduced to reduce followability to fine clearance when the resin foam is used for a foam sealing material.

Examples of the resin which is a material of the resin foam (foam) of the present invention preferably include a resin having thermoplasticity (thermoplastic resin), but is not particularly limited thereto. Note that the resin foam of the present invention may comprise only one resin or may comprise two or more resins.

Examples of the thermoplastic resin include polyolefin resins such as low density polyethylene, medium density polyethylene, high density polyethylene, linear low density polyethylene, polypropylene, a copolymer of ethylene and propylene, a copolymer of ethylene or propylene with another alpha olefin (such as butene-1, pentene-1, hexene-1, and 4-methylpentene-1), and a copolymer of ethylene with another ethylenic unsaturated monomer (such as vinyl acetate, acrylic acid, acrylate, methacrylic acid, methacrylate, and vinyl alcohol); styrenic resins such as polystyrene and an acrylonitrile-butadiene-styrene copolymer (ABS resin); polyamide resins such as 6-nylon, 66-nylon, and 12-nylon; polyamideimide; polyurethane; polyimide; polyether imide; acrylic resins such as polymethylmethacrylate; polyvinyl chloride; polyvinyl fluoride; alkenyl aromatic resins; polyester resins such as polyethylene terephthalate and polybutylene terephthalate; polycarbonate such as bisphenol A polycarbonate; polyacetal; and polyphenylene sulfide. The thermoplastic resin is used alone or in combination. Note that when the thermoplastic resin is a copolymer, it may be a copolymer in the form of a random copolymer or a block copolymer.

As the thermoplastic resin, polyolefin resins are preferred in terms of characteristics such as mechanical strength, heat resistance, and chemical resistance, and in terms of molding such as easiness in melt thermoforming. Preferred ones among the polyolefin resins include a resin of a type having a wide molecular weight distribution with a shoulder on the high molecular weight side, a slightly crosslinked type resin (a resin of a type crosslinked a little), and a long-chain branched type resin.

In particular, a polyolefin resin having a melt tension (temperature: 210° C., stress rate: 2.0 m/min, capillary: 1 mm in diameter×10 mm) of 3 to 50 cN (preferably 8 to 50 cN) is preferred as the above polyolefin resin in terms of obtaining a resin foam having a high expansion ratio, a high closed cell ratio, and a uniform cell structure.

The thermoplastic resin also includes a rubber component and/or a thermoplastic elastomer component. The rubber component and/or thermoplastic elastomer component, for example, has a glass transition temperature of equal to or lower than room temperature (fox example, 20° C. or lower), and therefore, when it is formed into a resin foam, the resulting foam is significantly excellent in flexibility and shape conformability.

The rubber component or thermoplastic elastomer component is not particularly limited as long as it has rubber elasticity and can be expanded, and examples thereof include various thermoplastic elastomers such as natural or synthetic rubber such as natural rubber, polyisobutylene, polyisoprene, chloroprene rubber, butyl rubber, and nitrile butyl rubber; olefinic elastomers such as ethylone-propylene copolymers, ethylene-propylene-diene copolymers, ethylene-vinylacetate copolymers, polybutene, and chlorinated polyethylene; styrenic elastomers such as styrene-butadiene-styrene copolymers, styrene-isoprene-styrene copolymers, and hydrogenated polymers derived from them; polyester elastomers; polyamide elastomers; and polyurethane elastomers. Further, these rubber components or thermoplastic elastomer components may be used alone or in combination.

Especially, an olefinic elastomer is preferred as the rubber component and/or thermoplastic elastomer component. An olefinic elastomer has good compatibility with a polyolefin resin illustrated as the thermoplastic resin.

The olefinic elastomer may be of a type having a structure in which a resin component A (olefinic resin component A) and a rubber component B are micro-phase separated. The olefinic elastomer may also be of a type in which the resin component A and the rubber component B are physically dispersed, or of a type in which the resin component A and the rubber component H are dynamically heat-treated in the presence of a crosslinking agent (thermoplastic vulcanizate, TPV).

In particular, an olefinic thermoplastic vulcanizate (TPV) is preferred as the olefinic elastomer. That is, the resin foam of the present invention preferably comprises an olefinic thermoplastic vulcanizate as the constituent resin. Since the TPV (olefinic thermoplastic vulcanizate) has a higher modulus of elasticity and a smaller compression set than TPO (uncrosslinked olefinic thermoplastic elastomer), it has good recovery properties and shows excellent recovery properties even when it is used for a resin foam.

The olefinic thermoplastic vulcanizate is obtained by dynamically heat-treating a mixture containing a resin component A (olefinic resin component A) forming a matrix and a rubber component B forming a domain in the presence of a crosslinking agent, and is a multiphase polymer having a sea island structure in which crosslinked rubber particles are finely dispersed as a domain (island phase) in the resin component A which is a matrix (sea phase).

Note that, in the present invention, when an olefinic thermoplastic vulcanizate is incorporated as a constituent resin, a thermoplastic elastomer composition comprising the olefinic thermoplastic vulcanizate and additives (such as a colorant such as carbon black; and a softener) may be used.

In particular, a material excellent in so-called rubber elasticity is suitable for the resin foam of the present invention in order to achieve flexibility at high compression and shape recovery after compression, that is, in order to allow large deformation and not to cause plastic deformation. From this point of view, the resin foam of the present invention preferably comprises the thermoplastic resin and the rubber component and/or thermoplastic elastomer component as a constituent resin.

When a resin constituting the resin foam of the present invention comprises a thermoplastic resin and a rubber component and/or thermoplastic elastomer component, the proportion of these components is not particularly limited. However, if the proportion of the rubber component and/or thermoplastic elastomer component is too low, the resulting resin foam may tend to have reduced cushioning properties or may have reduced recovery properties after compression. On the other hand, if the proportion of the rubber component and/or thermoplastic elastomer component is too high, outgassing may easily occur during the formation of the foam to make it difficult to obtain a highly expanded foam.

Therefore, with respect to the proportion of the thermoplastic resin and the rubber component and/or thermoplastic elastomer component in the resin constituting the resin foam of the present invention, the proportion of the former/the latter (on the basis of weight) is preferably 70/30 to 30/70, more preferably 60/40 to 30/70, further preferably 50/50 to 30/70.

Further, the resin foam of the present invention preferably contains a nucleating agent. When the nucleating agent is contained, the cell diameter of the resin foam can be easily controlled, and a foam having proper flexibility and excellent in cutting processability can be obtained.

Examples of the nucleating agent include oxides, composite oxides, metal carbonates, metal sulfates, metal hydroxides such as talc, silica, alumina, zeolite, calcium carbonate, magnesium carbonate, barium sulfate, zinc oxide, titanium oxide, aluminum hydroxide, magnesium hydroxide, mica, and montmorillonite; carbon particles, glass fiber, and carbon tubes. Note that the nucleating agent may be used alone or in combination.

The average particle size of the nucleating agent is preferably 0.3 to 1.5 μm, more preferably 0.4 to 1.2 μm, but is not particularly limited thereto. If the average particle size is too small, it may not sufficiently function as a nucleating agent, and on the other hand, if the average particle size is too large, the nucleating agent may break through the wall of a cell, which may prevent a high expansion ratio from being obtained. Note that the average particle size can be measured by a laser diffraction particle size distribution measuring method. For example, the average particle size can be measured (AUTO measuring mode) from a diluted dispersion of a sample by "MICROTRAC MT-3000" supplied by Leeds & Northrup Instruments, Inc.

When the resin foam of the present invention contains such a nucleating agent, the content thereof is not particularly limited, but if the content is too small, the effect of the incorporation of a nucleating agent as described above may not be obtained, and on the other hand, if the content is too large, foaming may be prevented when the foam is formed. Therefore, the content of the nucleating agent is preferably 0.5 to 150 parts by weight, more preferably 2 to 140 parts by weight, further preferably 3 to 130 parts by weight, relative to 100 parts by weight of the constituent resin.

Note that, when the thermoplastic elastomer composition is used in the present invention in incorporating an olefinic thermoplastic vulcanizate as a constituent resin, the nucleating agent may be added to the thermoplastic elastomer composition.

Since the resin foam of the present invention comprises the thermoplastic resin, it burns easily. For this reason, when the resin foam of the present invention is used particularly for applications in which it is indispensable to impart flame retardancy such as electronic appliance application, the resin foam of the present invention preferably contains a flame retardant.

The flame retardant is not particularly limited. However, chlorine-based and brominated flame retardants have a problem of generating harmful gas when they burn, and phosphorus and antimony flame retardants have problems such as harmfulness and explosibility. Therefore, non-halogen non-antimony inorganic flame retardants are preferred.

Examples of the inorganic flame retardants include hydrates of metal hydroxides and metal compounds. More specific examples include aluminum hydroxide, magnesium hydroxide, a hydrate of magnesium oxide or nickel oxide, and hydrates of magnesium oxide and zinc oxide. Especially, magnesium hydroxide is preferred. Note that the hydrated metal compounds may be surface-treated. Further, the flame retardant may be used alone or in combination.

When the resin foam of the present invention contains such a flame retardant, the content thereof is not particularly limited, but if the content is too small, the flame retardation effect may be small, and on the other hand, if the content is too large, highly expanded resin foam is hardly obtained. Therefore, the content of the flame retardant is preferably 5 to 70 parts by weight, more preferably 25 to 65 parts by weight, relative to 100 parts by weight of the constituent resin.

Further, the resin foam of the present invention may contain at least one aliphatic compound having a polar functional group and a melting point of 50 to 150° C., which is selected from among fatty acid, fatty amide, and fatty acid metallic soap. Note that in the present application, such an aliphatic compound may be simply referred to as an "aliphatic compound."

When the resin foam of the present invention contains such an aliphatic compound, it will have a cell structure which is not easily collapsed when it is processed (particularly, when it is punched), will have improved shape recovery properties, and will have improved processability (particularly, punchability). Note that it is estimated that processability is improved because such an aliphatic compound has high crystallinity and forms a strong film on a resin surface, and the film serves to prevent the walls of cells which form a cell structure from being blocked to each other when the aliphatic compound is added to the thermoplastic resin (particularly, polyolefin resin).

The aliphatic compound having a highly polar functional group is not easily dissolved particularly in polyolefin resins, and therefore it is easily precipitated on the surface of the resin foam, thus easily exhibiting the effect as described above.

The melting point of the aliphatic compound is preferably 50 to 150° C., more preferably 70 to 100° C., in terms of reducing the molding temperature for foam molding the resin composition, suppressing the degradation of resins (particularly, polyolefin resins), and imparting sublimation resistance.

As the fatty acids, those having about 18 to 38 (preferably 18 to 22) carbon atoms are preferred, and specific examples thereof include stearic acid, behenic acid, and 12-hydroxy stearic acid. Especially, behenic acid is particularly preferred.

As the fatty amides, those having about 18 to 38 (preferably 18 to 22) carbon atoms are preferred, which may be any of monoamide and bisamide. Specific examples thereof include stearamide, oleamide, erucamide, methylene bis-stearamide, and ethylene bis-stearamide. Especially, erucamide is particularly preferred.

Further, examples of the fatty acid metallic soap include fatty acid salt of aluminum, calcium, magnesium, lithium, barium, zinc, and lead.

In the resin foam of the present invention, fatty acids and fatty amides are particularly preferred as the aliphatic compound.

When the resin foam of the present invention contains such an aliphatic compound, the content thereof is not particularly limited, but if the content is too small, sufficient amount of the aliphatic compound will not be precipitated on the surface of the resin, making it difficult to obtain the effect of improvement of processability. On the other hand, if the content is too large, the resin composition will be plasticized and cannot maintain sufficient pressure during the foam molding. This causes a reduction in the content of a foaming agent (for example, an inert gas such as carbon dioxide), making it difficult to obtain a high expansion ratio. As a result, a foam having a desired density may not be obtained. Therefore, the content of the aliphatic compound is preferably 1 to 5 parts by weight, more preferably 1.5 to 3.5 parts by weight, further preferably 2 to 3 parts by weight, relative to 100 parts by weight of the constituent resin.

Further, the resin foam of the present invention may contain a lubricant. When a lubricant is contained, it improves the fluidity of the resin composition and can suppress the thermal degradation of a resin. Note that the lubricant is used alone or in combination.

Examples of the lubricant include, but are not limited to, hydrocarbon lubricants such as liquid paraffin, paraffin wax, microcrystalline wax, and polyethylene wax; and ester lubricants such as butyl stearate, stearic acid monoglyceride, pentaerythritol tetrastearate, hydrogenated castor oil, and stearyl stearate. The content of the lubricant in the resin composition can be suitably selected in the range that does not impair the effect of the present invention.

Furthermore, the resin foam of the present invention may optionally contain other additives. Examples of the additives include shrink resistant agents, age inhibitors, heat stabilizers, light resistant agents such as HALS, weathering agents, metal deactivators, ultraviolet absorbers, light stabilizers, stabilizers such as copper inhibitors, antimicrobial agents, antifungal agents, dispersing agents, tackifiers, colorants such as carbon black and organic pigments, and fillers. Note that the additives are used alone or in combination.

The content of these additives other than the above can be suitably selected in the range that does not impair the effect of the present invention. Note that, when the thermoplastic elastomer composition is used in the present invention in incorporating an uncrosslinked olefinic thermoplastic elastomer as a constituent resin, these additives may be added to the thermoplastic elastomer composition.

The resin composition for forming the resin foam of the present invention is obtained by mixing and kneading the thermoplastic resin or by mixing and kneading the thermoplastic resin and additives when additives such as the nucleating agent, aliphatic compound, and lubricant as described above are incorporated.

In the resin foam of the present invention, examples of the foaming process employed in the foam molding of the resin composition include, but are not limited to, generally used techniques such as a physical technique and a chemical technique. A common physical technique is a technique of forming cells by dispersing a low-boiling-point liquid (foaming agent) such as chlorofluorocarbon or hydrocarbon in a resin followed by heating to volatilize the foaming agent. Further, a common chemical technique is a technique of forming cells by a gas produced by thermal decomposition of a compound (foaming agent) added to a resin. However, in the common physical technique, there may occur problems about the combustibility, toxicity, and influence on the environment such as ozone layer depletion of the substance used as a blowing agent. Further, in the common chemical technique, a residue of a blowing gas remains in the foam. This may cause a trouble of contamination by a corrosive gas or impurities in the gas especially in electronic appliances where suppression of contamination is highly needed. Moreover, these physical and chemical foaming techniques are believed to be difficult to give a micro cell structure and to be very difficult to give micro cells of not more than 300 μm.

Therefore, a preferred foaming process in the present invention includes a technique of using a high-pressure gas as a foaming agent, particularly a technique of using a high-pressure inert gas as a foaming agent, in that a foam having a small cell diameter and a high cell density can be easily obtained. Note that inert gas means a gas inert to a resin in a resin composition. That is, the cell structure (foaming structure) of the resin foam of the present invention is preferably formed by a technique of using a high-pressure inert gas as a foaming agent. More specifically, the resin foam of the present invention is preferably formed through the steps of impregnating a resin composition with a high-pressure gas and subjecting the impregnated resin composition to decompression.

Therefore, in the resin foam of the present invention, a foaming and molding method of a resin composition using high-pressure gas as a foaming agent preferably includes a method of forming the resin foam through the steps of impregnating a resin composition with high-pressure gas and subjecting the impregnated resin composition to decompression. Specifically, preferred examples include a method of forming the resin foam through the steps of impregnating an unfoamed molded article comprising a resin composition with high-pressure gas and then subjecting the impregnated unfoamed molded article to decompression, and a method of forming the resin foam through the steps of impregnating a molten resin composition with a gas under pressure and then subjecting the impregnated resin composition to decompression and molding.

The inert gas is not particularly limited as long as it is inert to the resin as a material of the resin foam and the resin can be impregnated therewith, and examples thereof include carbon dioxide, nitrogen gas, and air. These gases may be mixed and used. Among others, carbon dioxide can be suitably used in that the resin can be impregnated with it in a large amount and at a high rate.

Further, from the viewpoint of increasing the rate of impregnation of the resin composition, the high-pressure gas (particularly inert gas, such as carbon dioxide) is preferably in a supercritical state. Such a gas in a supercritical state shows increased solubility in the resin and can be incorporated therein in a higher concentration. In addition, because of its high concentration, the supercritical gas generates a larger number of cell nuclei upon an abrupt pressure drop after impregnation. These cell nuclei grow to give cells, which are present in a higher density than in a foam having the same porosity but produced with the gas in another state. Consequently, use of a supercritical gas can give micro cells. Note that the critical temperature and critical pressure of carbon dioxide are 31° C. and 7.4 MPa, respectively.

In the resin foam of the present invention, the process of subjecting the resin composition to foam molding by a technique using a high-pressure gas as a foaming agent may include a batch system and a continuous system. In the batch system, the resin composition is previously molded into an unfoamed resin molded article (unfoamed resin molded product) in an adequate form such as a sheet form, and then the unfoamed resin molded article is impregnated with a high-pressure gas, and the unfoamed resin molded article is then released from the pressure to allow the molded article to expand. In the continuous system, the resin composition is kneaded under a pressure together with a high-pressure gas, and the kneaded mixture is molded into a molded article and, simultaneously, is released from the pressure. Thus, molding and foaming are performed simultaneously in the continuous system.

In the resin foam of the present invention, examples of the process for forming the unfoamed resin molded article used for foaming, when the resin composition is subjected to foam molding by a batch system, include a process in which the resin composition is extruded with an extruder such as a single-screw extruder or twin-screw extruder; a process in which the resin composition is uniformly kneaded beforehand with a kneading machine equipped with one or more blades typically of a roller, cam, kneader, or Banbury type, and the resulting mixture is press-molded typically with a hot-plate press to thereby produce an unfoamed resin molded article having a predetermined thickness; and a process in which the resin composition is molded with an injection molding machine. Further, the unfoamed resin molded article can be also formed by other forming processes in addition to extrusion, press molding, and injection molding. Furthermore, the shape of the unfoamed resin molded article is not particularly limited, and various shapes can be selected depending on applications. Examples of the shape include a sheet form, roll form, and plate form. Thus, in the resin foam of the present invention, when the resin composition is subjected to foam molding by a batch system, the resin composition can be formed by a suitable process to give an unfoamed resin molded article having a desired shape and thickness.

In the resin foam of the present invention, when the resin composition is subjected to foam molding by the above batch system, cells are formed in the resin through a gas impregnation step of putting the unfoamed resin molded article obtained as described above in a pressure-tight vessel (high pressure vessel) and injecting (introducing) a high-pressure gas (particularly an inert gas, such as carbon dioxide) to impregnate the unfoamed resin molded article with the high-pressure gas; a decompression step of releasing the pressure (typically, to atmospheric pressure) when the unfoamed resin molded article is sufficiently impregnated with the high-pressure gas to allow cell nuclei to be generated in the resin; and optionally (where necessary) a heating step of heating the resin to allow the cell nuclei to grow. Note that the cell nuclei may be allowed to grow at room temperature without providing the heating step. After the cells are allowed to grow in this way, the resin may be rapidly cooled with cold water as needed to fix its shape. Further, the introduction of the high-pressure gas may be performed continuously or discontinuously. Note that the heating for the growth of cell nuclei can be performed according to a known or common procedure such as heating with a water bath, oil bath, hot roll, hot-air oven, far infrared rays, near-infrared rays, or microwaves.

In the resin foam of the present invention, the foam molding of the resin composition by the above continuous system more specifically includes foam molding by a kneading/impregnation step of kneading the resin composition with an extruder such as a single-screw extruder or twin-screw extruder and, during this kneading, injecting (introducing) a high-pressure gas (particularly inert gas, such as carbon dioxide) to impregnate the resin composition with the sufficiently high-pressure gas; and a subsequent molding/decompression step of extruding the resin composition through a die arranged at a distal end of the extruder to thereby release the pressure (typically, to atmospheric pressure) to perform molding and foaming simultaneously. Further, in the foam molding of the resin composition in the continuous system, a heating step may be further provided to enhance cell growth by heating where necessary. After the cells are allowed to grow in this way, the resin may be rapidly cooled with cold water as needed to fix its shape. Further, the in introduction of the high-pressure gas may be performed continuously or discontinuously. Further, in the kneading/impregnation step and molding/decompression step, an injection molding machine or the like may be used in addition to an extruder. Note that the heating for the growth of cell nuclei can be performed according to a known or common procedure such as heating with a water bath, oil bath, hot roll, hot-air oven, far-infrared rays, near-infrared rays, or microwaves.

In the resin foam of the present invention, the mixed amount of the gas in the foam molding of the resin composition is, for example, preferably 2 to 10% by weight, more preferably 2.5 to 8% by weight, further preferably 3 to 6% by weight, relative to the total amount of the resin component of the resin composition, but is not particularly limited thereto. If the mixed amount of the gas is less than 2%, it may be unable to obtain a highly expanded foam, and on the other hand, if it exceeds 10%, the gas may be separated in a molding machine, preventing a highly expanded foam from being obtained.

In the resin foam of the present invention, in the gas impregnation step in the batch system or in the kneading/impregnation step in the continuous system for foam molding the resin composition, the pressure at which the unfoamed resin molded article or the resin composition is impregnated with a gas can be suitably selected in consideration of the type of gas and the operability. For example, when an inert gas, particularly carbon dioxide, is used as the gas, the pressure is 6 MPa or more (for example, 6 to 100 MPa), preferably 8 MPa or more (for example, 8 to 100 MPa). If the pressure of the gas is lower than 6 MPa, considerable cell growth may occur during foaming, and this may tend to result in too large cell diameters and hence in disadvantages such as insufficient dustproofing effect. The reasons for this are as follows. When impregnation is performed at a low pressure, the amount of gas impregnated is relatively small and cell nuclei are formed at a lower rate as compared with impregnation at higher pressures. As a result, the number of cell nuclei formed is smaller. Because of this, the gas amount per cell increases rather than decreases, resulting in excessively large cell diameters. Furthermore, in a region of pressures lower than 6 MPa, only a slight change in impregnation pressure results in considerable changes in cell diameter and cell density, and this may often impede the control of cell diameter and cell density.

Further, in the gas impregnation step in the batch system or in the kneading/impregnation step in the continuous system, when the resin composition is foamed and molded for forming the resin foam of the present invention, the temperature at which the unfoamed resin molded article or the resin composition is impregnated with high-pressure gas varies depending on the type of gas and resin used, and can be selected within a wide range. For example, when impregnation operability and other conditions are taken into account, the temperature is preferably 10 to 350° C. For example, when an unfoamed resin molded article in a sheet form is impregnated with a high-pressure gas in the batch system, the impregnation temperature is preferably 10 to 250° C., more preferably 40 to 240° C., further preferably 60 to 230° C. Further, when a high-pressure gas is injected into and kneaded with a resin composition in the continuous system, the impregnation temperature is preferably 60 to 350° C., more preferably 100 to 320° C., further preferably 150 to 300° C. Note that when carbon dioxide is used as a high-pressure gas, it is preferred to impregnate the gas at a temperature (impregnation temperature) of 32° C. or higher (particularly 40° C. or higher), in order to maintain its supercritical state.

Further, in the resin foam of the present invention, the decompression rate in the decompressing step in the foam molding of the resin composition by the batch system or continuous system is preferably 5 to 300 MPa/s in order to obtain uniform micro cells, but is not particularly limited thereto. Furthermore, the heating temperature in the heating step is, for example, 40 to 250° C. (preferably 60 to 250° C.).

Moreover, in the resin foam of the present invention, use of the above processes in the foam molding of the resin composition has an advantage that a highly expanded resin foam can be produced and a thick resin foam can be produced. For example, when the resin composition is subjected to foam molding by the continuous system, it is necessary to regulate the gap in the die at the tip of the extruder so as to be as narrow as possible (generally about 0.1 to 1.0 mm) for maintaining the pressure in the extruder in the kneading/impregnation step. This means that for obtaining a thick resin foam, the resin composition which has been extruded through such narrow gap should be foamed at a high expansion ratio. In the known techniques in use, however, a high expansion ratio is not obtained and the resulting resin foam has been limited to thin one (for example, one having a thickness of from 0.5 to 2.0 mm). In contrast, foaming and molding of the resin foam using a high-pressure gas can continuously produce a resin foam having a final thickness of from 0.50 to 5.00 mm.

Note that the thickness recovery ratio, average cell diameter, repulsive stress at 50% compression, apparent density, relative density, and the like can also be controlled by suitably selecting and setting, for example, operating conditions such as temperature, pressure, and time in the gas impregnation step or kneading/impregnation step, operating conditions such as a decompression rate, temperature, and pressure in the decompression step or molding/decompression step, heating temperature in the heating step after decompression or molding/decompression, and the like depending on the type of gas, thermoplastic resin, rubber component, and/or thermoplastic elastomer component to be used.

In particular, the resin foam of the present invention is preferably formed through the steps of impregnating a resin composition comprising a thermoplastic resin, and at least a nucleating agent and an aliphatic compound with high-pressure gas (particularly inert gas) and then subjecting the impregnated resin composition to decompression. This is because it is possible to easily obtain a resin foam which has a small average cell diameter, has a cell structure with a high closed-cell structure ratio, has a high expansion ratio, has a cell structure which is hardly deformed and compressed, is excellent in strain recovery properties at the time of pressing, and is excellent in processability.

Further, the resin foam of the present invention is more preferably formed through the steps of impregnating a resin composition comprising a thermoplastic resin, and at least a nucleating agent having a particularly small average particle size, and an aliphatic compound with an inert gas in a supercritical state and then subjecting the impregnated resin composition to decompression. This is because it is possible to easily obtain a resin foam which has a very small average cell diameter, has a cell structure with a high closed-cell structure ratio, has a high expansion ratio, has a cell structure which is hardly deformed and compressed, is excellent in strain recovery properties at the time of pressing, can be more suppressed from the breakage of a cell wall by a nucleating agent, and is more excellent in processability.

Furthermore, the resin foam of the present invention is preferably formed through the steps of impregnating a resin composition comprising a thermoplastic resin, and at least 0.5 to 150 parts by weight of a nucleating agent relative to 100 parts by weight of the thermoplastic resin, and 1 to 5 parts by weight of an aliphatic compound relative to 100 parts by weight of the thermoplastic resin with high-pressure gas (particularly inert gas) and then subjecting the impregnated resin composition to decompression, wherein the thermoplastic resin is a mixture of a thermoplastic resin and a rubber component and/or a thermoplastic elastomer component, the proportion of the former/the latter (on the basis of weight) being 70/30 to 40/60.

Since the resin foam of the present invention has a specific thickness recovery ratio, it is excellent in dustproofness, particularly dynamic dustproofness when it is used as a foam sealing material. In particular, in the case where the foam sealing material is attached to clearance, the entry of foreign matter such as dust can be prevented by the quick recovery of thickness to fill the clearance when the foam sealing material is deformed by the impact from vibration or dropping, that is, when the foam sealing material is deformed into a state where it is compressed to a thickness of the clearance to which it is attached or less. Further, when the resin foam of the present invention has a specific average cell diameter, a specific repulsive stress at 50% compression, and a specific apparent density, it is more excellent in dustproofness and flexibility, and when it is used as a foam sealing material, the sealing material can follow fine clearance. Note that examples of the above fine clearance include a clearance of about 0.05 to 0.5 mm.

(Foam Sealing Material)

The foam sealing material of the present invention is a material comprising the above resin foam. Note that the shape of the foam sealing material is preferably a sheet form (including film form), but is not particularly limited thereto.

Further, the foam sealing material may have a structure, for example, consisting only of the resin foam, or may have a structure in which the resin foam is laminated with other layers (particularly, an adhesive layer (pressure-sensitive adhesive layer), a base material layer, and the like).

Further, the foam sealing material of the present invention preferably has an adhesive layer. For example, when the foam sealing material of the present invention is a foam sealing material in a sheet form, it may have an adhesive layer on one surface or both surfaces thereof. When the foam sealing material has an adhesive layer, for example, a mount for processing can be provided on the foam sealing material through the adhesive layer, and further, the foam sealing material can be fixed or tentatively fixed to an adherend.

Examples of the pressure-sensitive adhesives for forming the adhesive layer for use can be suitably selected from, but are not limited to, known adhesives such as acrylic pressure-sensitive adhesives, rubber pressure-sensitive adhesives (such as natural rubber pressure-sensitive adhesives and synthetic rubber pressure-sensitive adhesives), silicone pressure-sensitive adhesives, polyester pressure-sensitive adhesives, urethane pressure-sensitive adhesives, polyamide pressure-sensitive adhesives, epoxy pressure-sensitive adhesives, vinyl alkyl ether pressure-sensitive adhesives, and fluorine pressure-sensitive adhesives. These pressure sensitive adhesives may be used alone or in combination. Note that the pressure-sensitive adhesives may be pressure-sensitive adhesives of any form including emulsion pressure-sensitive adhesives, solvent pressure-sensitive adhesives, hot melt type adhesives, oligomer pressure-sensitive adhesives, and solid pressure-sensitive adhesives. Especially, acrylic pressure-sensitive adhesives are preferred as the pressure-sensitive adhesives from the point of view of the pollution control to adherends and the like.

The thickness of the adhesive layer is preferably 2 to 100 µm, more preferably 10 to 100 µm. The adhesive layer is preferably as thin as possible because a thinner layer has a higher effect of preventing adhesion of soil and dust at an end. Note that the adhesive layer may have any form of a single layer and a laminate.

In the foam sealing material of the present invention, the adhesive layer may be provided through other layers (lower layers). Examples of such lower layers include other adhesive layers, an intermediate layer, an undercoat layer, and a base material layer (particularly, a film layer, a nonwoven fabric layer, and the like). Further, the adhesive layer may be protected by a release film (separator) (for example, releasing paper, a release film, and the like).

Since the foam sealing material of the present invention comprises the above resin foam, it has good dustproofness, particularly good dynamic dustproofness, and has a flexibility that can follow fine clearance.

The foam sealing material of the present invention may be processed so as to have a desired shape, thickness, and the like. For example, it may be processed to various shapes according to the apparatus, equipment, housing, member, and the like in which it is used.

Since the foam sealing material of the present invention has the performance as described above, it is suitably used as a member used for attaching (mounting) various members or parts to a predetermined site. In particular, the foam sealing material of the present invention is suitably used in electric or electronic appliances as a member used for attaching (mounting) parts constituting the electric or electronic appliances to a predetermined site.

That is, the foam sealing material of the present invention is suitably used for electric or electronic appliances. That is, the foam sealing material of the present invention may be a foamed member for electric or electronic appliances.

Examples of the various members or parts which can be attached (mounted) utilizing the foam member of the present invention preferably include, but are not particularly limited to, various members or parts in electric or electronic appliances. Examples of such members or parts for electric or electronic appliances include optical members or optical components such as image display members (displays) (particularly small-sized image display members) which are mounted on image display devices such as liquid crystal displays, electroluminescence displays, and plasma displays, and cameras and lenses (particularly small-sized cameras and lenses) which are mounted on mobile communication devices such as so-called "cellular phones" and "personal digital assistants".

Examples of suitable specific use modes of the foam sealing material of the present invention include using it around a display such as LCD (liquid crystal display) and using by inserting it between a display such as LCD (liquid crystal display) and a housing (window part) for the purpose of dustproofing, shading, cushioning, or the like.

EXAMPLES

The present invention will be more specifically described below with reference to examples, but it should be noted that these examples are never construed to limit the scope of the present invention.

Example 1

In a twin-screw kneader were kneaded, at a temperature of 200° C., 35 parts by weight of polypropylene [melt flow rate (MFR): 0.35 g/10 min], 60 parts by weight of a thermoplastic elastomer composition (a blend (olefinic thermoplastic vulcanizate, TPV) of polypropylene (PP) and an ethylene/propylene/5-ethylidene-2-norbornene terpolymer (EPT), the ratio of polypropylene to the ethylene/propylene/5-ethylidene-2-norbornene terpolymer being 25/75 based on weight, containing 15.0% by weight of carbon black), 5 parts by weight of a lubricant (a masterbatch in which 10 parts by weight of polyethylene was blended with 1 part by weight of stearic acid monoglyceride), 10 parts by weight of a nucleating agent (magnesium hydroxide, average particle size: 0.8 μm), and 2 parts by weight of erucamide (melting point: 80 to 85° C.). After kneading, the kneaded material was extruded into strands, cooled with water, and cut and formed into pellets.

The pellets were charged into a tandem single-screw extruder supplied by Japan Steel Works, Ltd., and 3.0% by weight of carbon dioxide gas was injected at an atmospheric temperature of 220° C. and at a pressure of 14 MPa, where the pressure became 18 MPa after injection. The pellets were sufficiently saturated with the carbon dioxide gas, cooled to a temperature suitable for foaming, and extruded through a die, yielding a resin foam (in a sheet form).

Example 2

A resin foam (in a sheet form) was obtained in the same manner as in Example 1 except that 4.0% by weight of carbon dioxide gas was injected into a tandem single-screw extruder supplied by Japan Steel Works, Ltd.

Example 3

A resin foam (in a sheet form) was obtained in the same manner as in Example 1 except that 4.2% by weight of carbon dioxide gas was injected into a tandem single-screw extruder supplied by Japan Steel Works, Ltd.

Example 4

In a twin-screw kneader were kneaded, at a temperature of 200° C., 50 parts by weight of polypropylene [melt flow rate (MFR): 0.35 g/10 min], 40 parts by weight of a thermoplastic elastomer composition (a blend (olefinic thermoplastic vulcanizate, TPV) of polypropylene (PP) and an ethylene/propylene/5-ethylidene-2-norbornene terpolymer (EPT), the ratio of polypropylene to the ethylene/propylene/5-ethylidene-2-norbornene terpolymer being 25/75 based on weight, containing 15.0% by weight of carbon black), 10 parts by weight of a lubricant (a masterbatch in which 10 parts by weight of polyethylene was blended with 1 part by weight of stearic acid monoglyceride), 10 parts by weight of a nucleating agent (magnesium hydroxide, average particle size: 0.8 μm), and 2 parts by weight of erucamide (melting point: 80 to 85° C.). After kneading, the kneaded material was extruded into strands, cooled with water, and cut and formed into pellets.

The pellets were charged into a tandem single-screw extruder supplied by Japan Steel Works, Ltd., and 3.5% by weight of carbon dioxide gas was injected at an atmospheric temperature of 220° C. and at a pressure of 14 MPa, where the pressure became 18 MPa after injection. The pellets were sufficiently saturated with the carbon dioxide gas, cooled to a temperature suitable for foaming, and extruded through a die, yielding a resin foam (in a sheet form).

Comparative Example 1

In a twin-screw kneader were kneaded, at a temperature of 200° C., 50 parts by weight of polypropylene [melt flow rate (MFR): 0.35 g/10 min], 40 parts by weight of a thermoplastic elastomer composition (a blend (TPO) of polypropylene (PP) and an ethylene/propylene/5-ethylidene-2-norbornene terpolymer (EPT), the ratio of polypropylene to the ethylene/propylene/5-ethylidene-2-norbornene terpolymer being 30:70 based on weight, containing 15.0% by weight of carbon black), 10 parts by weight of a lubricant (a masterbatch in which 10 parts by weight of polyethylene was blended with 1 part by weight of stearic acid monoglyceride), 10 parts by weight of a nucleating agent (magnesium hydroxide, average particle size: 0.8 μm), and 2 parts by weight of erucamide (melting point: 80 to 85° C.). After kneading, the kneaded material was extruded into strands, cooled with water, and cut and formed into pellets.

The pellets were charged into a tandem single-screw extruder supplied by Japan Steel Works, Ltd., and 3.8% by weight of carbon dioxide gas was injected at an atmospheric temperature of 220° C. and at a pressure of 14 MPa, where the pressure became 18 MPa after injection. The pellets were sufficiently saturated with the carbon dioxide gas, cooled to a temperature suitable for foaming, and extruded through a die, yielding a resin foam (in a sheet form).

Comparative Example 2

A resin foam essentially comprising polyurethane (in a sheet form, average cell diameter: 70 to 80 μm, repulsive stress at 50% compression: 1.0 N/cm$^2$, apparent density: 0.15 g/cm$^3$)

Comparative Example 3

In a twin-screw kneader were kneaded, at a temperature of 200° C., 20 parts by weight of polypropylene [melt flow rate (MFR): 0.35 g/10 min], 80 parts by weight of a thermoplastic elastomer composition (a blend (TPO) of polypropylene (PP) and an ethylene/propylene/5-ethylidene-2-norbornene terpolymer (EPT), the ratio of polypropylene to the ethylene/propylene/5-ethylidene-2-norbornene terpolymer being 30:70 based on weight, containing 16.7% by weight of carbon black), 10 parts by weight of a lubricant (a masterbatch in which 10 parts by weight of polyethylene was blended with 1 part by weight of stearic acid monoglyceride), 10 parts by weight of a nucleating agent (magnesium hydroxide, average particle size: 0.8 μm), and 2 parts by weight of erucamide (melting point: 80 to 85° C.). After kneading, the kneaded material was extruded into strands, cooled with water, and cut and formed into pellets.

The pellets were charged into a tandem single-screw extruder supplied by Japan Steel Works, Ltd., and 3.8% by weight of carbon dioxide gas was injected at an atmospheric temperature of 220° C. and at a pressure of 14 MPa, where the pressure became 18 MPa after injection. The pellets were sufficiently saturated with the carbon dioxide gas, cooled to a temperature suitable for foaming, and extruded through a die, yielding a resin foam (in a sheet form).

(Evaluation)

The foams of Examples and Comparative Examples were measured or evaluated for apparent density, repulsive load at 50% compression (50% compression load, repulsive stress at 50% compression), average cell diameter, thickness recovery ratio, dynamic dustproofness, and clearance followability. The results are shown in Table 1.

(Apparent Density)

A foam was punched with a punch die having a size of 30 mm×30 mm to give a punched sample, and the size of the punched sample was measured. The thickness of the sample was measured with a 1/100 dial gauge having a measuring terminal of 20 mm in diameter (φ). The volume of the sample was calculated from these values. Next, the weight of the sample was measured with an even balance. From the volume of the sample and the weight of the sample, the apparent density (g/cm$^3$) of the foam was calculated.

(Repulsive Load at 50% Compression (50% Compression Load, Repulsive Stress at 50% Compression))

The repulsive force at 50% compression was measured according to the method for measuring a compressive hardness prescribed in JIS K 6767.

(Average Cell Diameter)

The average cell diameter of a resin foam was determined by capturing an enlarged image of a cellular portion of a foam using a digital microscope (trade name "VHX-600" supplied by Koyence Corporation), measuring the area of all the cells appeared in a definite area (1 mm$^2$) of the cut surface, converting the area to the equivalent circle diameter, and then averaging it with the number of cells.

Note that image analysis software (trade name "Win ROOF" supplied by Mitani Corporation) was used for image analysis.

(Thickness Recovery Ratio)

A resin foam was compressed in a thickness direction to a thickness equal to 20% of the original thickness (initial thickness) in a 23° C. atmosphere using an electromagnetic force micro material tester (Micro-Servo) ("MMT-250", supplied by Shimadzu Corporation), and the compression state was maintained for 1 minute. After releasing the compression, the thickness recovery behavior (thickness change, thickness recovery) was photographed with a high speed camera, and the thickness 1 second after releasing a compressed state was determined from the photographed image. Then, the thickness recovery ratio was determined from the following formula.

$$\text{Thickness recovery ratio} = (\text{thickness 1 second after releasing a compression state})/(\text{initial thickness}) \times 100$$

(Dynamic Dustproofness)

Figure 1:
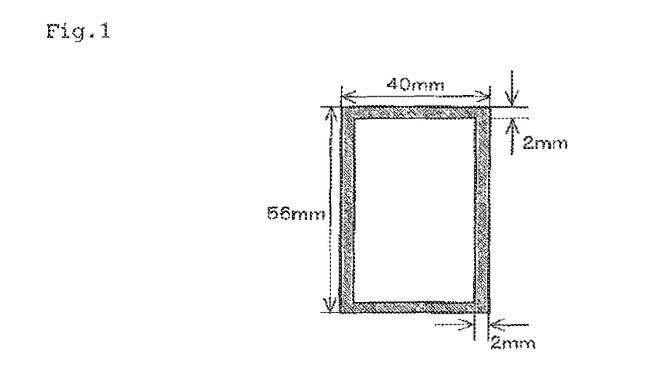
FIG. 1 is a schematic view of a sample for evaluation used in the evaluation of dynamic dustproofness.
Figure 2:
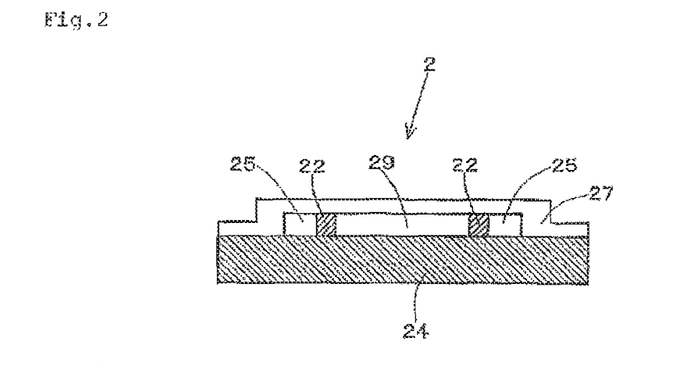
FIG. 2 is a cross-sectional schematic view of an evaluation container for evaluating dynamic dustproofness to which a sample for evaluation is attached.
Figure 4:
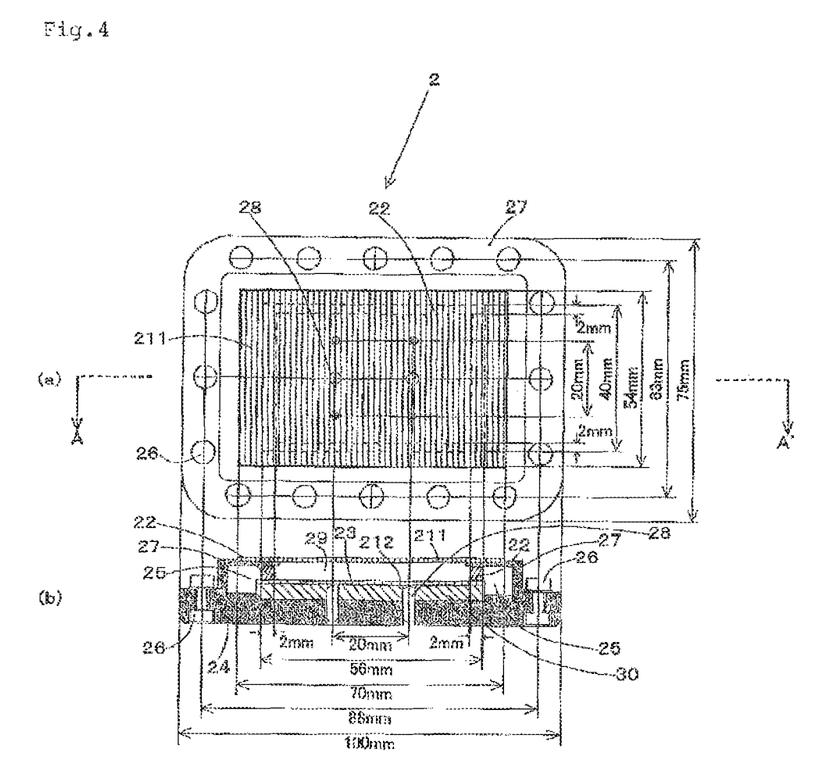
FIG. 4 is a top view and a sectional end view of an evaluation container to which a sample for evaluation is attached.

A resin foam was punched into a frame shape to prepare a sample for evaluation (refer to FIG. 1), and then the sample was attached to an evaluation container (an evaluation container for evaluating dynamic dustproofness to be described below, refer to FIGS. 2 and 4) as shown in FIGS. 2 and 4. Next, particulate matter was supplied to the outside part (powder supply part) of the sample for evaluation in the evaluation container; and the evaluation container to which particulate matter has been supplied was placed in a tumbler (rotating tank), and the tumbler was rotated counter clockwise to repetitively apply an impact to the evaluation container. Then, the dynamic dustproofness was evaluated by measuring the number of the powder which has passed through the sample for evaluation and entered into the inner part of the evaluation container.

FIG. 2 is a simple cross-sectional schematic view of an evaluation container for evaluating dynamic dustproofness to which a sample for evaluation is attached. In FIG. 2, reference numeral 2 denotes an evaluation container to which a sample for evaluation is attached (a package to which a sample for evaluation is attached); reference numeral 22 denotes a sample for evaluation (a resin foam punched into a frame shape); reference numeral 24 denotes a base plate; reference numeral 25 denotes a powder supply part; reference numeral 27 denotes a foam compression plate; and reference numeral 29 denotes the inner part of the evaluation container (inner part of a package). In the evaluation container to which the sample for evaluation of FIG. 2 is attached, the powder supply part 25 and the inner part 29 of the evaluation container are separated by the sample for evaluation 22, and the powder supply part 25 and the inner part 29 of the evaluation container form a closed system.

Figure 3:
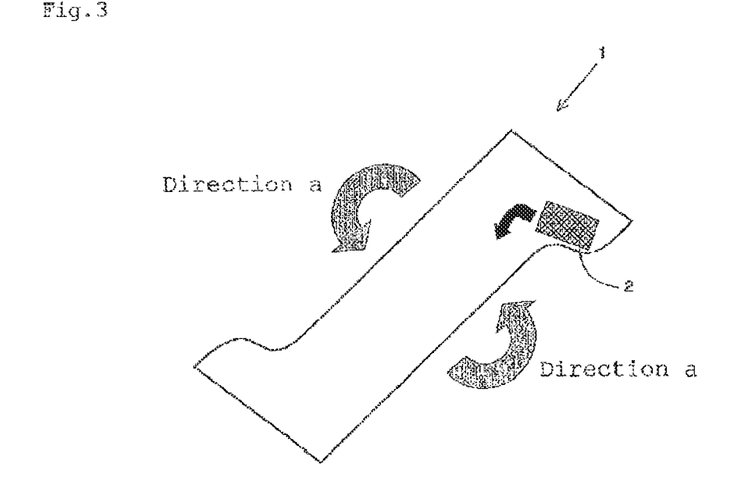
FIG. 3 is a cross-sectional schematic view showing a tumbler on which an evaluation container is placed.

FIG. 3 is a cross-sectional schematic view showing a tumbler on which the evaluation container is placed. In FIG. 3, reference numeral 1 denotes a tumbler; and reference numeral 2 denotes the evaluation container to which the sample for evaluation is attached. Further, the direction a is the rotating direction of the tumbler. When the tumbler 1 rotates, the evaluation container 2 will be repeatedly applied with an impact.

[Evaluation Method of Dynamic Dustproofness]

The evaluation method of dynamic dustproofness will be described in more detail.

A resin foam was punched into a frame shape (a window-frame shape) (width: 2 mm) as shown in FIG. 1, which was used as a sample for evaluation.

The sample for evaluation was mounted on an evaluation container (an evaluation container for evaluating dynamic dustproofness, refer to FIGS. 2 and 4) as shown in FIGS. 2 and 4. Note that the compression ratio of the sample for evaluation during the mounting was 50% (compressed so as to give a thickness equal to 50% of the initial thickness).

As shown in FIG. 4, the sample for evaluation is provided between the foam compression plate and a black acrylic sheet on an aluminum sheet fixed to the base plate. In the evaluation container on which the sample for evaluation is mounted, the sample for evaluation forms a closed system in a certain area inside the container.

The sample for evaluation was mounted on the evaluation container as shown in FIG. 4; and then, 0.1 g of cornstarch (particle diameter: 17 μm) as powder dust was put into the powder supply part, and the evaluation container was placed in the tumbler (rotating tank, drum-type drop tester), which was rotated at a rate of 1 rpm.

The tumbler was rotated by a specified number of times so as to provide 100 times of collision (repetitive impact), and then the package was disassembled. Particles passed through the sample for evaluation from the powder supply part, and adhered to the black acrylic sheet on the aluminum sheet and a black acrylic sheet as a cover plate, were observed with a digital microscope (device name "VHX-600" supplied by Keyence Corporation). Static images were prepared from the black acrylic sheet on the side of the aluminum sheet and the black acrylic sheet on the side of the cover plate, and these images were subjected to binarization with image analysis software (software name "Win ROOF", supplied by Mitani Corporation) to measure the total particle area as the number of particles. Note that the observation was performed in a clean bench in order to reduce the influence of floating dust in the air.

When the total particle area of both the particles adhering to the black acrylic sheet on the side of the aluminum sheet and the particles adhering to the black acrylic sheet on the side of the cover plate is less than 100 mm$^2$, the resin foam was rated as good; when the total particle area is from 100 mm$^2$ to 200 mm$^2$, the resin foam was rated as slightly poor; and when the total particle area exceeds 200 mm$^2$, the resin foam was rated as poor. Note that the total area of the particle observation surface was 1872 mm$^2$. Note that even if the resin foam is evaluated to be slightly poor, it has no problem in practical performance.

When the total particle area of both the particles adhering to the black acrylic sheet on the side of the aluminum sheet and the particles adhering to the black acrylic sheet on the side of the cover plate is less than 1500 [Pixel×Pixel], the resin foam was rated as good; when the total particle area is 1500 to 2000 [Pixel×Pixel], the resin foam was rated as slightly poor; and when the total particle area exceeds 2000 [Pixel×Pixel], the resin foam was rated as poor. Note that the total area of the particle observation surface was 20000 [Pixel×Pixel]. Note that even if the resin foam is evaluated to be slightly poor, it has no problem in practical performance.

FIG. 4 shows a top view and a sectional end view of an evaluation container (evaluation container for evaluating dynamic dustproofness) to which a sample for evaluation is attached. FIG. 4 (a) shows a top view of an evaluation container for evaluating dynamic dustproofness to which a sample for evaluation is attached. Further, FIG. 4 (b) is an A-A' line sectional end view of an evaluation container to which a sample for evaluation is attached. The dynamic dustproofness (dustproofness at the time of an impact) of the sample for evaluation can be evaluated with the evaluation container by attaching the sample for evaluation thereto and then dropping the evaluation container. In FIG. 4, reference numeral 2 denotes an evaluation container to which a sample for evaluation is attached; reference numeral 211 denotes a black acrylic sheet (black acrylic sheet on the side of a cover plate); reference numeral 212 denotes a black acrylic sheet (black acrylic sheet on the side of an aluminum sheet); reference numeral 22 denotes a sample for evaluation (resin foam in a frame shape); reference numeral 23 denotes an aluminum sheet; reference numeral 24 denotes a base plate; reference numeral 25 denotes a powder supply part; reference numeral 26 denotes a screw; reference numeral 27 denotes a foam compression plate; reference numeral 28 denotes a pin; reference numeral 29 denotes an inner part of an evaluation container; and reference numeral 30 denotes an aluminum spacer. The compression ratio of the sample for evaluation 22 can be controlled by adjusting the thickness of the aluminum spacer 30. Note that, although omitted in the top view (a) of the evaluation container for evaluating dynamic dustproofness to which the sample for evaluation is attached in FIG. 4, cover plate-fixing brackets are provided between the opposing screws to firmly fix the black acrylic sheet 211 to the foam compression plate 27.

(Clearance Followability)

Figure 5:
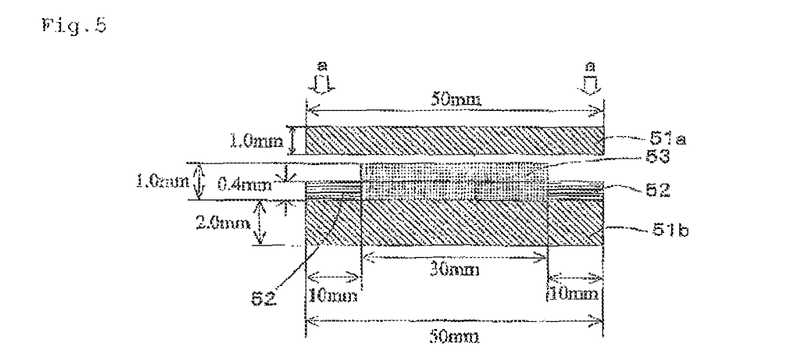
FIG. 5 is a side surface schematic view showing a jig for the evaluation of clearance followability on which a resin foam is mounted.

A resin foam in a sheet form having a thickness of 1 mm was prepared. The resin foam (foam 53) was set in a jig (a jig for evaluating clearance followability) as shown in FIG. 5, and the state of deformation of the acrylic sheet (acrylic sheet 51a having a thickness of 1.0 mm) on the top surface side was visually observed. Specifically, spacers having a thickness of 0.4 mm (spacers 52 having a thickness of 0.4 mm) were placed on both end parts of the acrylic sheet having a thickness of 2.0 mm (acrylic sheet 51b having a thickness of 2.0 mm), and the resin foam (foam 53) was placed on the central part between the spacers. The acrylic sheet having a thickness of 1.0 mm (acrylic sheet 51a having a thickness of 1.0 mm) was placed on the top surface of the resin foam, and a load (load a) was applied from the side of the acrylic sheet (acrylic sheet 51a having a thickness of 1.0 mm) on the top surface at the positions corresponding to the spacers on both the end parts so as to compress the resin foam. The presence or absence of deformation of the acrylic sheet (acrylic sheet 51a having a thickness of 1.0 mm) on the top surface at this time was visually observed. When deformation was not observed, clearance followability of the resin foam was evaluated to be "good", and when deformation was observed, the clearance followability of the resin foam was evaluated to be "poor."

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Apparent density (g/cm$^3$) | | 0.05 | 0.06 | 0.07 | 0.04 | 0.05 | 0.15 | 0.06 |
| Repulsive stress at 50% compression (N/cm$^2$) | | 1.2 | 1.6 | 1.8 | 1.7 | 1.8 | 1.0 | 1.4 |
| Average cell diameter (μm) | | 80 | 66 | 44 | 150 | 80 | 80 | 80 |
| Thickness recovery ratio (%) | | 82 | 68 | 78 | 93 | 62 | 58 | 35 |
| Dynamic dust-proofness | Total particle area (mm$^2$) | 85 Good | 43 Good | 15 Good | 152 Slightly poor | 253 Poor | 523 Poor | 324 Poor |
| | Total particle area (Pixel × Pixel) | 958 Good | 485 Good | 169 Good | 1713 Slightly poor | 2851 Poor | 5894 Poor | 3651 Poor |
| Clearance followability | | Good | Good | Good | Good | Good | Good | Good |

Strain may be produced in a resin foam when an impact is applied. For example, when an impact is applied after a member or a part is attached to a predetermined site using a resin foam, strain may be produced in the resin foam to produce a gap between the resin foam and the member or the part or between the resin foam and the site to which the member or the part is attached. Such a gap has a bad influence on dustproofness, airtightness, and the like.

The resin foam which can be evaluated to have good dynamic dustproofness shows high recovery from the strain produced when an impact is applied, and the above gap is not easily produced. On the other hand, the resin foam which can be evaluated to have poor dynamic dustproofness shows poor recovery from the strain produced when an impact is applied, and the above gap is easily produced.

INDUSTRIAL APPLICABILITY

The resin foam of the present invention is excellent in dustproof performance, particularly dustproof performance in a dynamic environment and is used for a foam sealing material.

REFERENCE SIGNS LIST

1 Tumbler
2 Evaluation container to which sample for evaluation is attached
211 Black acrylic sheet
212 Black acrylic sheet
22 Sample for evaluation
23 Aluminum sheet
24 Base plate
25 Powder supply part
26 Screw
27 Foam compression plate
28 Pin
29 Inner part of evaluation container
30 Aluminum spacer
51*a* Acrylic sheet
51*b* Acrylic sheet.
52 Spacer
53 Resin foam
a Load

The invention claimed is:
1. A resin foam having a thickness recovery ratio of 65% or more, wherein the thickness recovery ratio is defined as a ratio of a thickness 1 second after releasing a compressed state to an initial thickness, when the resin foam is compressed for 1 minute in the thickness direction so as to give a thickness equal to 20% of the initial thickness in a 23° C. atmosphere; and then the compressed state is released in a 23° C. atmosphere,
wherein the resin foam has an average cell diameter of 10 to 180 μm, a repulsive stress at 50% compression of 0.1 to 3.0 N/cm$^2$, and an apparent density of 0.01 to 0.10 g/cm$^3$, wherein the repulsive stress at 50% compression is defined as a repulsive load when the resin foam is compressed in the thickness direction so as to give a thickness equal to 50% of the initial thickness in a 23° C. atmosphere,
wherein a resin constituting the resin foam includes a thermoplastic resin, and
wherein the resin foam has a dynamic dustproofness expressed by less than 100 mm$^2$ and less than 1500 Pixel×Pixel of the total particle area of both the particles adhering to the black acrylic sheet on the side of the aluminum sheet and the particles adhering to the black acrylic sheet on the side of the cover plate.

2. The resin foam according to claim 1, wherein the resin foam is formed through the steps of impregnating a resin composition with high-pressure gas and then subjecting the impregnated resin composition to decompression.

3. The resin foam according to claim 2, wherein the gas is an inert gas.

4. The resin foam according to claim 3, wherein the inert gas is carbon dioxide.

5. The resin foam according to claim 2, wherein the gas is a gas in a supercritical state.

6. A foam sealing material comprising a resin foam according to claim 1.

7. The foam sealing material according to claim 6, wherein an adhesive layer is formed on the resin foam.

8. The foam sealing material according to claim 7, wherein the adhesive layer is formed on the resin foam through a film layer.

9. The foam sealing material according to claim 7, wherein the adhesive layer is an acrylic pressure-sensitive adhesive layer.

* * * * *